United States Patent [19]

Kramer et al.

[11] Patent Number: 4,836,513
[45] Date of Patent: Jun. 6, 1989

[54] HYDRAULICALLY DAMPED ANTI-VIBRATION MOUNT WITH A FLEXIBLE FLAP AS A DYNAMIC RATE INHIBITOR

[75] Inventors: Robert H. Kramer, Celina; Roger R. Koons, St. Marys, both of Ohio

[73] Assignee: The Goodyear Tire & Rubber Company, Akron, Ohio

[21] Appl. No.: 168,832

[22] Filed: Mar. 16, 1988

[51] Int. Cl.$^4$ .......... F16M 5/00; F16M 13/00
[52] U.S. Cl. .................. 267/140.1; 248/562
[58] Field of Search .......... 267/35, 140.1, 219, 267/140.2, 140.3, 153, 152, 113; 188/322.18, 322.22; 180/300, 312; 123/192 R, 195 A; 248/562, 636, 638

[56] References Cited

U.S. PATENT DOCUMENTS

| | | | |
|---|---|---|---|
| 4,607,828 | 8/1986 | Bodin et al. | 267/140.1 |
| 4,650,168 | 3/1987 | Andra et al. | 267/140.1 |
| 4,662,486 | 5/1987 | Stenberg | 188/322.18 X |
| 4,697,794 | 10/1987 | Brenner | 267/140.1 X |

FOREIGN PATENT DOCUMENTS 0191703  8/1986 European Pat. Off. ......... 267/140.1
3439614  4/1986 Fed. Rep. of Germany ... 267/140.1

Primary Examiner—Robert J. Oberleitner
Attorney, Agent, or Firm—M. R. Dion, Sr.

[57] ABSTRACT

A hydraulically damped anti-vibration mount has a flexible diaphragm, an outer metal casing, an annular rubber spring and an inner metal portion, together defining a cavity filled with a fluid. A damper plate divides the cavity into an upper chamber and a lower chamber which are in fluid communication through a damper channel located within the damper plate. A cup-shaped bumper attached to the inner metal portion and extending axially inward into the upper chamber has a radially outwardly extending flange located at an end distal to the inner metal portion. A flexible flap in the shape of an "h" or a wishbone extends radially outwardly from the flange toward the outer metal casing to within a clearance of about 1 mm to about 6 mm to inhibit the dynamic rate of the mount.

9 Claims, 4 Drawing Sheets

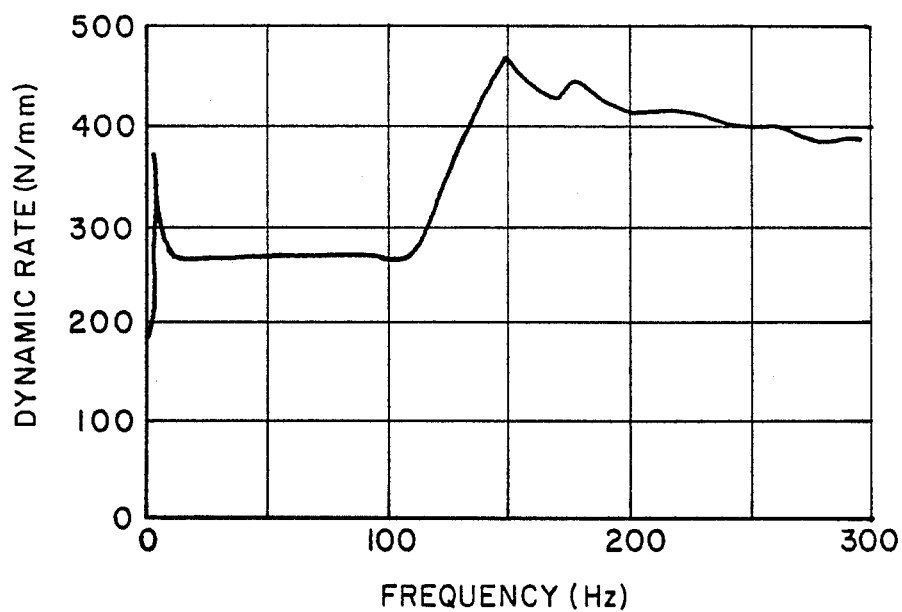
FIG. 3  *PRIOR ART*
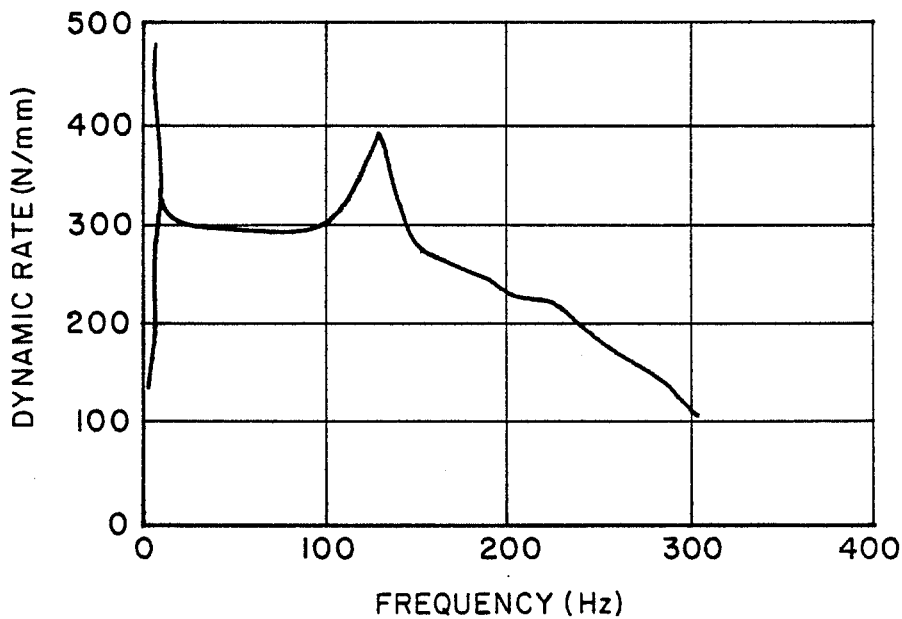
FIG. 4  *PRIOR ART*

HYDRAULICALLY DAMPED ANTI-VIBRATION MOUNT WITH A FLEXIBLE FLAP AS A DYNAMIC RATE INHIBITOR

FIELD OF THE INVENTION

The present invention relates to a hydraulically damped anti-vibration mount, especially to be used between a power unit of a motor vehicle and a supporting frame or part of the chassis. More particularly, it relates to a mount having a cup-shaped bumper extending from an inner metallic end portion into a fluid filled cavity. Most particularly, it relates to a mount having a flexible flap extending radially outwardly from a flange of the cup-shaped bumper in order to reduce the dynamic rate at higher vibration frequencies.

BACKGROUND OF THE INVENTION

Restricted hydraulically damped mounts are those which have a mechanism to prevent excessive travel of one end portion relative to the other, particularly in the tension mode. Such bumper stops have been disclosed in U.S. Pat. Nos. 4,607,828 and 4,650,168. Non-restricted mounts are those that lack that particular feature and rely on the strength of the rubber spring as well as its adhesion to the related metallic portions to prevent their coming apart. The present invention can be used in both types of mounts.

The dynamic rate is a measure of the spring stiffness of a mount at a given load and a given amplitude at varying vibration frequencies. It has been found that at higher frequencies, for example, 100 to 300 Hz, non-restricted mounts generally increase in dynamic rate. This increase in spring stiffness translates into noise and vibrations which may be transmitted between the power unit being suspended and the supporting frame. It was discovered that for restricted mounts having a bumper stop in the form of a cylinder with an outwardly extending flange, the dynamic rate in the same frequency range had a tendency to be decreased. However, it was understood that the diameter of the bumper stop had to be restricted in order to prevent rubbing or other contact between the flange and the side of the mount which can occur during any radial relative movement of one end of the mount with respect to the other.

In view of those considerations, it is an object of the present invention to provide a hydraulically damped anti-vibration mount in which the dynamic rate at higher frequencies is considerably reduced. It is a further object of the invention to provide a mount which avoids the detrimental effects of contact with the side of the mount by a rigid portion of the structure contained therein.

SUMMARY OF THE INVENTION

In accordance with the present invention, there is provided a hydraulically damped anti-vibration mount comprising: a flexible diaphragm, an outer metal casing, an annular rubber spring and an inner metal portion, together defining a cavity filled with a fluid; a damper plate dividing the cavity into an upper chamber and a lower chamber which are in fluid communication through a damper channel located within the damper plate; and a cup-shaped bumper attached to the inner metal portion and extending axially inward into the upper chamber having a radially outwardly extending flange located at an end distal to the inner metal portion; the improvement comprising having a flexible flap extending radially outwardly from the flange toward the outer metal casing. The flap can be made of a polymeric material or a thin metallic material. The flexible flap can extend to a clearance from the inner cavity wall of 1 to 6 mm, preferably 1 to 3.5 mm.

BRIEF DESCRIPTION OF THE DRAWINGS

FIG. 3 is a plot of dynamic rate vs. frequency for a conventional unrestricted mount.

FIG. 4 is a plot of dynamic rate vs. frequency for a conventional restricted mount.

DETAILED DESCRIPTION OF THE INVENTION

Figure 1:
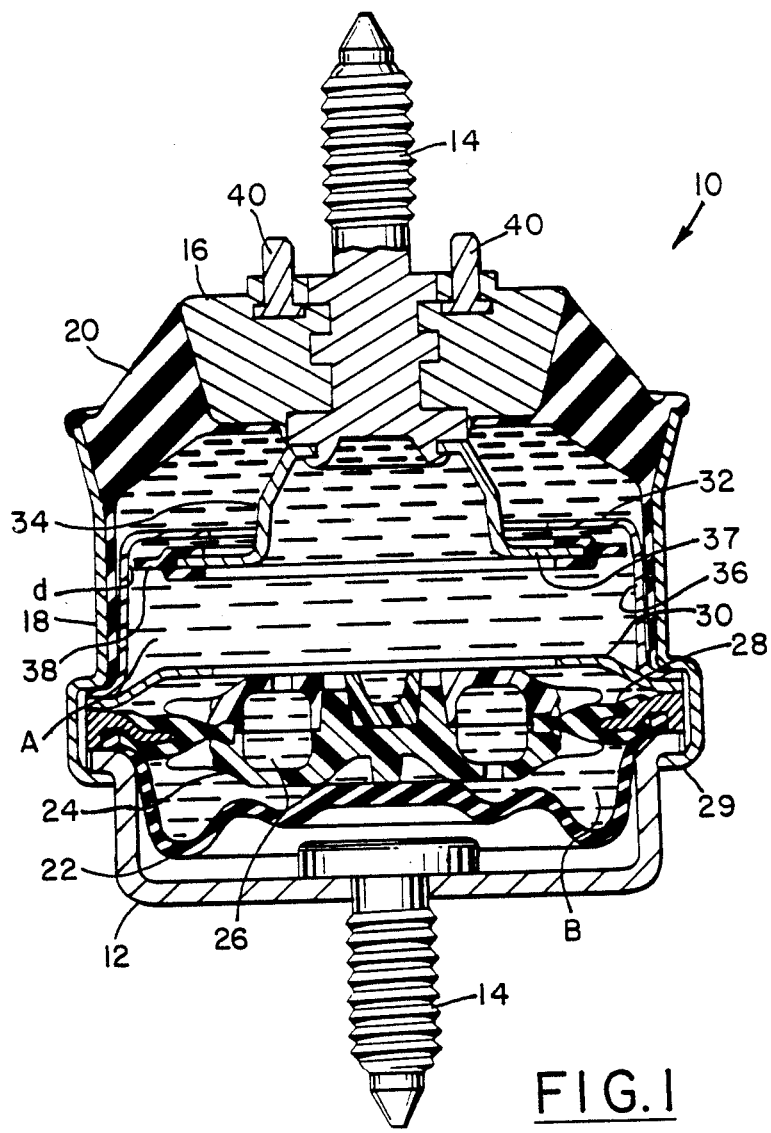
FIG. 1 is a cross sectional view of a restricted hydraulically damped anti-vibration mount, illustrating the feature of the present invention.
Figure 2:
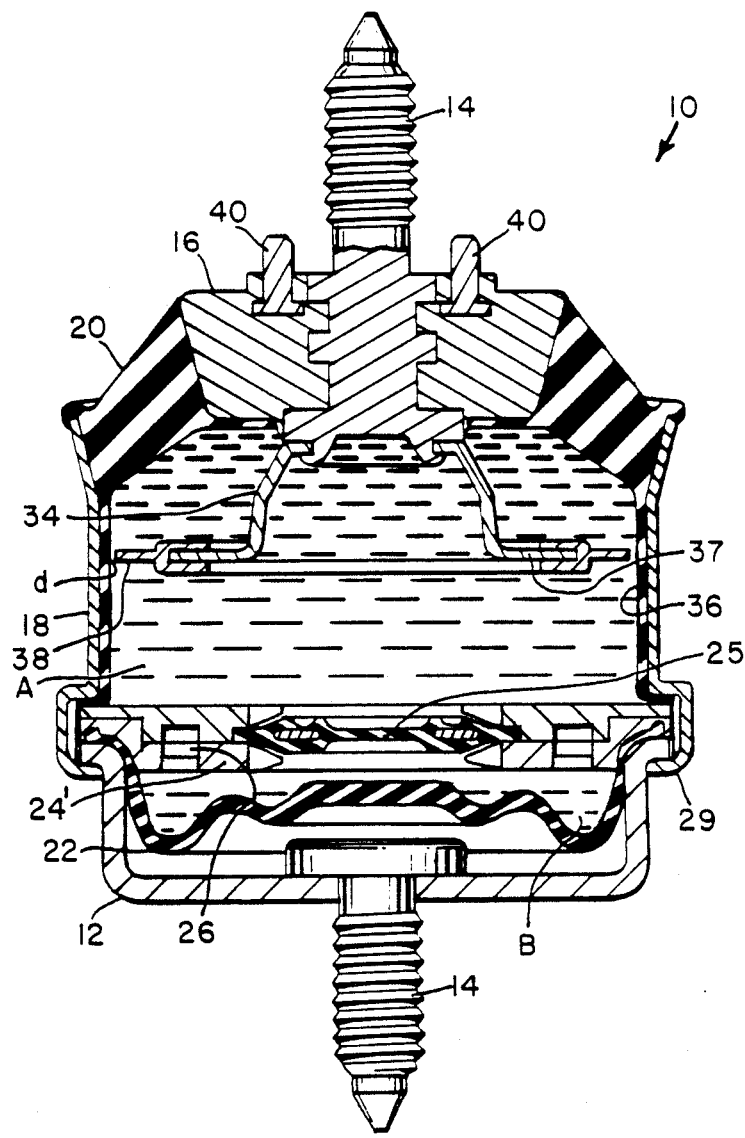
FIG. 2 is a cross sectional view of a non-restricted hydraulically damped anti-vibration mount, illustrating another embodiment of the feature of the present invention.

One main distinction between the restricted mount of FIG. 1 and the non-restricted mount of FIG. 2 lies in the presence of the tension restrictor (32) and the compression restrictor (30) illustrated in FIG. 1 but not in FIG. 2. The purpose of these restrictors is to limit the travel of one end of the mount relative to the other during the occurrence of extreme deflection between a power unit to be suspended and a supporting frame of a vehicle. Another distinction is that the mount of FIG. 1 is shown with a flexible decoupling damper plate (24) while the mount of FIG. 2 is shown with a rigid damper plate (24') having a disc-type decoupler (25) contained therein. The mount of FIG. 1, shown generally at (10), is comprised of a flexible diaphragm (22), an outer metal casing (18), an annular rubber spring (20) and an inner metal portion (16), together defining a cavity filled with a fluid; a damper plate (24) dividing the cavity into an upper chamber (A) and a lower chamber (B) which are in fluid communication through a damper channel (26) located within the damper plate (24); a tension restrictor (32) and a compression restrictor (30) each being an annular ring extending radially inward from a crimped portion (29) of the outer metal casing (18); and a cup-shaped bumper (34) attached to the inner metal portion (16) and extending axially inward into the upper chamber (A), having a radially outwardly extending flange (37) located at an end distal to the inner metal portion (16) and in between the tension restrictor (32) and the compression restrictor (30); and a flexible flap (38) extending radially outwardly from the flange (37) to within a clearance (d) from an inner cavity wall (36). Optionally illustrated are studs (14) extending from inner metal portion (16) and end cap (12) which may be used to attach the mount to a vehicle power unit and to its supporting chassis as are locating pins (40) which are used to orient the mount relative to either of the isolated components. It is to be understood that the terms "upper" and "lower" are used only for the clarity of the description since the mount could just as well be used in a reverse orientation. In addition, the studs (14) could be any other attachment means suitable for connection to the units to be isolated.

Figure 1A:
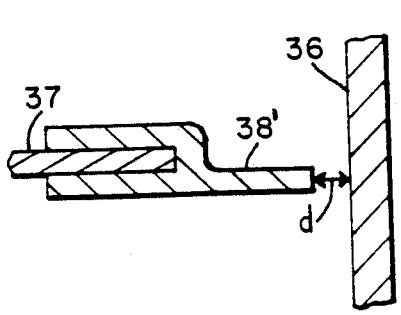
FIG. 1A and FIG. 1B illustrate alternate embodiments of the feature of the present invention.
Figure 1B:
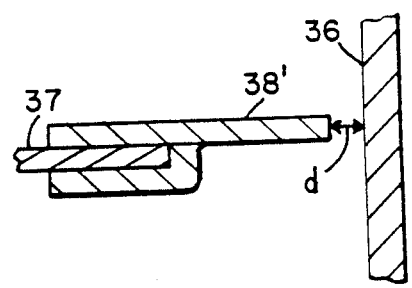

While the particular feature of the present invention, flap (38) extending from flange (37), is illustrated as being made of rubber and having a wishbone cross section, FIGS. 1A and 1B illustrate the alternate embodiments wherein in FIG. 1A the h-shaped flap (38') extends from the bottom of flange (37) and in FIG. 1B the flap (38') extends from the top of the flange (37). It should also be appreciated that the flap could also be made out of any flexible material such as the metal illustrated in FIGS. 1A and 1B.

As described above, the main distinction between FIG. 1 and FIG. 2 lies in that the mount of FIG. 2 does not have the tension restrictor (32) and the compression restrictor (30). In addition, the flexible flap (38) is illustrated as being metallic. Furthermore, it will be appreciated that the use of a rigid damper plate (24') as shown in FIG. 2 in a restricted mount as shown in FIG. 1 would preclude the need for the compression restrictor (30) as the rigid damper (24') would serve the function of compression restrictor.

In operation, during low amplitude, high frequency vibrations occurring between the inner metal portion (16) and the end cap (12), the hydraulic fluid in the upper chamber (A) is set in a vibrating motion by the combination of the inner metal portion (16) and the rubber spring (20) to cause a similar vibration to the damper plate (24) about its resilient peripheral support (28) as shown in FIG. 1 or to the disc-type decoupler (25) within the rigid damper plate (24') as shown in FIG. 2. The effect of the frequency on the dynamic rate is illustrated in FIG. 3 for a conventional mount having the same dimensions as the mounts illustrated in FIGS. 1 and 2 except for the absence of the cup-shaped bumper (34) and, of course its attached portions flange (37) and flap (38), but having the tension restrictor (32) of FIG. 1 and the rigid damper plate (24') of FIG. 2. The rise in frequency above 110 Hz results in a drastic increase in the dynamic rate which translates into the spring stiffness of the mount which manifests itself as an increase in the noise or vibration being transmitted between the power unit and the vehicle chassis.

FIG. 4 illustrates the dynamic rate versus frequency plot of another conventional mount similar to the mount just described with the addition of a cup-shaped bumper. The cup-shaped bumper had a clearance between the end of the flange portion and the sidewall of the cavity of 6.5 mm. This clearance is maintained in order to avoid contact between the end of the flange and the sidewall of the cavity if the mount was to be flexed in a radial direction.

Figure 5:
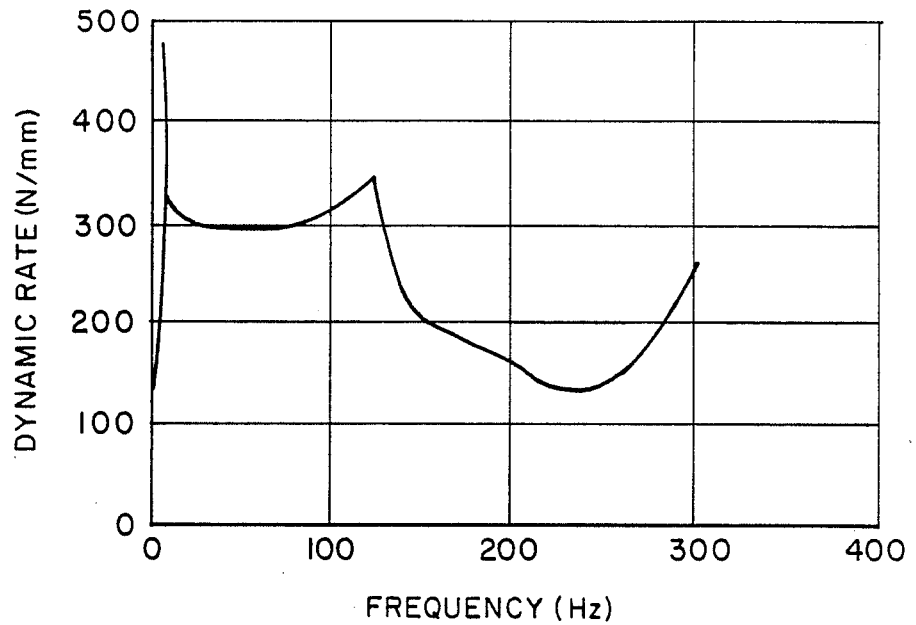
FIG. 5 is a plot of dynamic rate vs. frequency for a mount of the present invention.

FIG. 5 illustrates a plot of the dynamic rate versus frequency for a mount embodying the present invention. The flexible flap was extended from the flange to within 3.5 mm of the sidwall of the cavity.

A comparison of the plots in FIGS. 3, 4 and 5 illustrate the dynamic rate inhibiting effect of the flexible flap over the two conventional mounts, particularly in the range of about 125–250 Hz. This results in a reduction of the noise and vibration which may be transmitted between a power drive unit and the supporting frame or chassis from which it is isolated.

While certain representative embodiments have been shown for the purpose of illustrating the present invention, it will be apparent to those skilled in the art that various changes and modifications may be made therein without departing from the spirit or scope of the invention.

We claim:

1. A hydraulically damped anti-vibration mount comprising: a flexible diaphragm (22), an outer metal casing (18), an annular rubber spring (20) and an inner metal portion (16), together defining a cavity filled with a fluid; a damper plate (24) dividing the cavity into an upper chamber (A) and a lower chamber (B) which are in fluid communication through a damper channel (26) located within the damper plate (24); and a cup-shaped bumper (34) attached to the inner metal portion (16) and extending axially inward into the upper chamber (A), having a radially outwardly extending flange (37) located at an end distal to the inner metal portion (16); the improvement comprising having a flexible flap (38) selected from a group consisting of a wishbone cross-sectional shape and an h-shape extending radially outwardly from the flange (37) toward the outer metal casing (18) to inhibit the dynamic rate of the mount.

2. The mount according to claim 1 wherein the flap is made of a polymeric material.

3. The mount according to claim 1 wherein the flap is made of a metallic material.

4. The mount according to claim 1 further comprising a tension restrictor (32) and a commpression restrictor (30), each being an annular ring extending radially inward from a crimped portion (29) of the outer metal casing (18).

5. The mount according to claim 4 further comprising an end cap (12).

6. A hydraulically damped anti-vibration mount comprising: a flexible diaphragm (22), an outer metal casing (18), an annular rubber spring (20) and an inner metal portion (16), together defining a cavity filled with a fluid; a damper plate (24) dividing the cavity into an upper chamber (A) and a lower chamber (B) which are in fluid communication through a damper channel (26) located within the damper plate (24); and a cup-shaped bumper (34) attached to the inner metal portion (16) and extending axially inward into the upper chamber (A), having a radially outwardly extending flange (37) located at an end distal to the inner metal portion (16); the improvement comprising having a flexible flap (38) extending radially outwardly from the flange (37) toward the outer metal casing (18) to within a clearance (d) of about 1 mm to about 6 mm from an inner cavity wall (36).

7. The mount according to claim 6 wherein the flap has a wishbone cross-sectional shape.

8. The mount according to claim 6 wherein the flap is h-shaped.

9. A hydraulically damped anti-vibration mount (10) comprising: a flexible diaphragm (22), an outer metal casing (18), an annular rubber spring (20) and an inner metal portion (16) together defining a cavity filled with a fluid; a damper plate (24) dividing the cavity into an upper chamber (A) and a lower chamber (B) which are in fluid communication through a damper channel (26) located within the damper plate (24); a tension restrictor (32) and a compression restrictor (30) each being an annular ring extending radially inward from a crimped portion (29) of the outer metal casing (18); and a cup-shaped bumper (34) attached to the inner metal portion (16) and extending axially inward into the upper chamber (A), having a radially outwardly extending flange (37) located at an end distal to the inner metal portion (16) and in between the tension restrictor (32) and the compression restrictor (30); the improvement comprising having a flexible flap (38) extending radially outwardly from the flange (37) within a clearance (d) of 1 to 6 mm of an inner cavity wall (36).

* * * * *